United States Patent
Papini (10) Patent No.: US 11,585,318 B2
(45) Date of Patent: Feb. 21, 2023

(54) WIND-POWERED GENERATOR

(71) Applicant: David Papini, Reston, VA (US)

(72) Inventor: David Papini, Reston, VA (US)

( * ) Notice: Subject to any disclaimer, the term of this patent is extended or adjusted under 35 U.S.C. 154(b) by 0 days.

(21) Appl. No.: 17/547,493

(22) Filed: Dec. 10, 2021

(65) Prior Publication Data

US 2022/0195979 A1 Jun. 23, 2022

Related U.S. Application Data

(60) Provisional application No. 63/126,659, filed on Dec. 17, 2020.

(51) Int. Cl.
| | |
|---|---|
| F03D 1/04 | (2006.01) |
| F03D 9/25 | (2016.01) |
| H02K 5/20 | (2006.01) |
| H02K 7/18 | (2006.01) |
| F03D 80/80 | (2016.01) |

(52) U.S. Cl.
CPC ............ *F03D 1/04* (2013.01); *F03D 9/25* (2016.05); *F03D 80/82* (2016.05); *H02K 5/207* (2021.01); *H02K 7/1838* (2013.01); *F05B 2220/706* (2013.01)

(58) Field of Classification Search
CPC .. F03D 1/04; F03D 9/25; F03D 80/82; H02K 5/207; H02K 7/1838; F05B 2220/706
USPC ..................................................... 290/44, 55
See application file for complete search history.

(56) References Cited

U.S. PATENT DOCUMENTS

| | | |
|---|---|---|
| 4,080,100 A | 3/1978 | McNeese |
| 7,018,166 B2 | 3/2006 | Gaskell |
| D665,736 S | 8/2012 | Presz, Jr. |

(Continued)

FOREIGN PATENT DOCUMENTS

| | | |
|---|---|---|
| GB | 249011 A | 3/1926 |
| KR | 20100135058 A | 12/2010 |

(Continued)

OTHER PUBLICATIONS

Author Unknown, turbines, (Design—©Questel) orbit.com, [Online PDF compilation of references selected by examiner] 52 pages. Print Dates Range Jun. 29, 2021-Jul. 28, 2020 [Retrieved Jan. 11, 2022].

(Continued)

*Primary Examiner* — Charles Reid, Jr.
(74) *Attorney, Agent, or Firm* — MH2 Technology Law Group LLP (57) ABSTRACT

A wind-powered generator includes a housing having an inlet, an outlet, and a throat that are coaxial about an axis of symmetry of the housing. A nacelle includes a first rotor mounted on a first end of the nacelle and positioned at least partially within the inlet, the first rotor outputting a first power output, and a second rotor mounted on a second end of the nacelle, the second rotor being positioned at least partially within the outlet and having a diameter less than the first rotor. The second rotor outputting a second power output. The first and second power outputs are combined to provide a combined power output, and a nacelle ratio between outer diameters of the nacelle at the inlet and at the outlet is between about 1.60-1.70, and a housing ratio between inner diameters of the housing at the inlet and at the outlet is about 1.85-1.97.

20 Claims, 8 Drawing Sheets

(56) References Cited

U.S. PATENT DOCUMENTS

| | | |
|---|---|---|
| 8,268,030 B2 | 9/2012 | Abramov |
| D671,071 S | 11/2012 | Ai |
| 8,358,023 B2 | 1/2013 | West |
| D697,868 S | 1/2014 | Rebsdorf |
| 8,736,098 B2 | 5/2014 | Choi et al. |
| D707,628 S | 6/2014 | Guinard |
| 8,759,998 B2 | 6/2014 | Gilbert |
| 8,829,706 B1 | 9/2014 | Sammy |
| D715,737 S | 10/2014 | Cooper |
| D727,264 S | 4/2015 | Schmid |
| D748,576 S | 2/2016 | Guinard |
| 9,512,817 B2 | 12/2016 | Wood |
| 9,664,172 B2 | 5/2017 | Wieser |
| D801,927 S | 11/2017 | Cooper, II |
| 9,869,299 B2 | 1/2018 | Blake et al. |
| D824,331 S | 7/2018 | Schuenemann |
| D829,172 S | 9/2018 | Cooper |
| D869,395 S | 12/2019 | Huang |
| D909,302 S | 2/2021 | Kesby |
| D935,406 S | 11/2021 | Geiken |
| 2011/0305570 A1 | 12/2011 | Shin et al. |
| 2012/0003077 A1 | 1/2012 | Churchill |
| 2012/0175882 A1* | 7/2012 | Sterling ............... F03D 1/04 290/55 |
| 2013/0266439 A1* | 10/2013 | Rubak ............... F01D 1/04 415/208.1 |
| 2014/0159375 A1* | 6/2014 | Friesth ............... F03D 13/20 290/55 |

FOREIGN PATENT DOCUMENTS

| | | |
|---|---|---|
| KR | 101106205 B1 | 1/2012 |
| KR | 20120082505 A | 7/2012 |
| KR | 101446106 B1 | 10/2014 |
| WO | 81/00286 A1 | 2/1981 |
| WO | 2012/159226 A1 | 11/2012 |

OTHER PUBLICATIONS

Ohya, Yuji, Schematic view of a diffuser shrouded wind turbine, Dec. 2005, Research Gate, https://www.researchgate.net/figure/Schematic-view-of-a-diffuser-shrouded-wind-turbine-a-overview-of-system-b-flow_fig1_223365637; 17 pages.

Gipe, Paul, Elena Diffuser Augmented Wind Turbine, May 7, 2010, Wind-Works, http://www.wind-works.org/cms/index.php?id=672&tx_ttnews%5Btt_news%5D=147&cHash=1b8b897e4b9efe8cf827758ac9a15369; 3 pages.

Author Unknown, Change in the wind, Jan. 15, 1998, Down To Earth, https://www.downtoearth.org.in/news/change-in-the-wind-21053; 12 pages.

Restriction Requirement dated Feb. 1, 2022, U.S. Appl. No. 29/762,575; 5 pages.

* cited by examiner

WIND-POWERED GENERATOR

CROSS-REFERENCE TO RELATED APPLICATIONS

This application claims benefit of priority to U.S. Provisional Application No. 63/126,659 filed on Dec. 17, 2020, which is incorporated by reference in its entirety.

FIELD OF THE DISCLOSURE

The present disclosure relates to a wind-powered generator, and more particularly, to a wind-powered generator configured for use in residential and portable applications.

BACKGROUND OF THE DISCLOSURE

Green energy (e.g., solar, wind, hydro, etc.) has seen a rapid rise in importance during the past decade, due at least in part to a global consciousness regarding fossil fuel consumption and its impact on the environment. As more consumers have begun to feel a desire to do "their part" for ensuring a healthy environment, the demand for improved devices to enable such consumers to aid in the global effort has increased.

While many consumers would like to contribute to the global effort by utilizing green energy, not all consumers have the ability to do so. For example, depending a consumer's location, energy producers utilizing green energy may be limited or even non-existent. Further, initial investment in green energy sources/generators can be high, thus discouraging energy producers from stepping into the market, and limiting many consumers ability to capitalize on the available, green energy sources.

Wind is one readily available power source and can be found in almost every location at most times. However, due to certain constraints (e.g., neighbor complaints, housing regulations, wildlife danger, etc.) consumers may be unable to even consider installation of a wind-powered generator.

Further, even in locations where wind-powered generators may be considered, based on certain aspects associated with various locations (e.g., wind shear, obstacles, etc.), wind airflow may be insufficient to generate stable power output using presently known wind turbines.

Therefore, despite many consumers' desire to derive power from wind, the proposition is often too costly and inefficient to be of interest.

U.S. Pat. No. 9,869,299 discloses a wind energy system and method for using the same.

SUMMARY OF THE DISCLOSURE

The present inventor has recognized that general use wind-generators can be improved for use in many areas not previously practical for wind-power generation. Embodiments of the present disclosure are directed to providing such improved wind-power generators.

According to embodiments of the present invention, a wind-powered generator is provided. The wind-powered generator includes a housing defining an internal volume and having an inlet, an outlet, and a throat, the inlet, outlet, and throat being coaxial about an axis of symmetry of the housing, wherein a portion of the internal volume between a leading edge of the housing and the throat is defined by revolution of a curve about the axis of symmetry, and the internal volume between the throat and a trailing edge of the outlet is defined by revolution of a substantially straight line about the axis of symmetry, and a nacelle mounted within the internal volume. The nacelle includes a first rotor mounted on a first end of the nacelle and positioned at least partially within the inlet, the first rotor comprising a first output shaft configured to output a first power output, and a second rotor mounted on a second end of the nacelle opposite the first end, the second rotor being positioned at least partially within the outlet and having a diameter less than the first rotor, wherein the second rotor comprises a second output shaft configured to output a second power output. The first power output and the second power output are combined within an interior portion of the nacelle to provide a combined power output of the wind-powered generator, and a nacelle ratio between an outer diameter of the nacelle at the inlet to an outer diameter of the nacelle at the outlet ranges from between about 1.60-1.70 as measured, and a housing ratio of an inner diameter of the housing at the inlet to an inner diameter of the housing at the outlet ranges from about 1.85-1.97.

By providing a wind-powered generator according to the above, it becomes possible to generate power from wind in many locations that were previously unable to efficiently do so. Further, by shrouding and protecting the rotating portions of the wind-powered generator with an external housing, protection from and to the rotating parts can be provided while further enhancing laminar flow through the housing.

A midpoint-inlet-housing ratio between the inner diameter of the housing at a midpoint of the housing along the axis of symmetry and the inner diameter of the housing at the inlet may range between about 0.60 to 0.80 and a midpoint-outlet-housing ratio between the inner diameter of the housing at the midpoint of the housing and the inner diameter of the housing at the outlet may range between about 1.30 to 1.40.

A midpoint-inlet-nacelle ratio between the outer diameter of the nacelle at a midpoint of the nacelle along the axis of symmetry and the outer diameter of the nacelle at the inlet may range between about 0.70 to 0.85 and a midpoint-outlet-nacelle ratio between the outer diameter of the nacelle at the midpoint of the nacelle and the outer diameter of the nacelle at the outlet may range between about 1.20 to 1.35.

A ratio of total length of the housing to the inlet diameter may range between 1.25 and 1.60, preferably 1.43.

At least one of an external surface of the nacelle and an internal surface of the housing may include a coating configured to reduce skin friction.

The nacelle may include one or more cooling inlets positioned in proximity to the first rotor, and one or more cooling outlets positioned in proximity to the second rotor.

The dimensions of a bounding box taken about the wind-powered generator may range from about 55 cm to about 73 cm in length, and about 40 cm to 56 cm in height and width.

The wind-powered generator may further include two or more electrical generators operably connected to the first and second output shafts to generate the combined output to produce electrical power, and a voltage converter configured to convert the electrical power to enable matching of an output voltage of the wind-powered generator to a voltage at an installation site.

According to further embodiments, a method for using the wind-powered generator described above is provided. The method includes mounting the wind-powered generator directly or indirectly on a building, adjusting an output voltage of the wind-powered generator, and connecting the wind-powered generator to an electrical installation of the building.

According to yet further embodiments of the present disclosure, a portable wind-powered generator is provided. The portable wind-powered generator includes a housing defining an internal volume, and the housing includes an inlet forming a first opening to the internal volume and positioned at a first end portion of the housing, and an outlet forming a second opening to the internal volume and positioned at a second end portion of the housing. The portable wind-powered generator further includes a first rotor having a first rotor diameter enabling rotation within the first opening and comprising a first mounting portion and a first output shaft, a second rotor having a second rotor diameter less than the first rotor diameter enabling rotation within the second opening, the second rotor comprising a second mounting portion and a second output shaft, and a hollow nacelle. The hollow nacelle includes an inlet end configured to enable affixing of the first mounting portion to the nacelle, an outlet end configured to enable affixing of the second mounting portion to the nacelle, and at least two electrical generators positioned within an internal portion of the nacelle, wherein the first output shaft is linked to a first of the at least two electrical generators and the second output shaft is linked to a second of the at least two electrical generators within the internal portion of the nacelle. A voltage converter configured to receive electrical power from the at least two generators and convert a voltage of the electrical power to a determined voltage is also provided.

By providing such a portable wind-powered generator, locations not previously able to benefit from wind power can become wind enabled. Motorhomes and RVs may particularly benefit by being able to live "off the grid" for longer periods of time by dismounting the portable wind-powered generator at a first location, travelling to another desired location, and remounting the wind-powered generator. Further, by shrouding and protecting the rotating portions of the wind-powered generator with an external housing, protection from and to the rotating parts can be provided while further enhancing laminar flow through the housing.

The adjustable voltage converter may be positioned within the internal portion of the nacelle.

The dimensions of a bounding box taken about the wind-powered generator may range from about 55 cm to about 73 cm in length, and about 40 cm to 56 cm in height and width.

The housing may be configured to be removably mounted to a building fixture.

The housing may include a circumferential reinforcement configured to enable clamping of the housing within a mounting fixture.

The determined voltage may match the voltage of an electrical installation of a building on which the portable wind-powered generator is mounted, and wherein the voltage converter is preferably adjustable.

A midpoint-inlet-housing ratio between the inner diameter of the housing at a midpoint of the housing along the axis of symmetry and the inner diameter of the housing at the inlet may range between about 0.60 to 0.80 and a midpoint-outlet-housing ratio between the inner diameter of the housing at the midpoint of the housing and the inner diameter of the housing at the outlet may range between about 1.30 to 1.40. A midpoint-inlet-nacelle ratio between the outer diameter of the nacelle at a midpoint of the nacelle along the axis of symmetry and the outer diameter of the nacelle at the inlet may range between about 0.70 to 0.85 and a midpoint-outlet-nacelle ratio between the outer diameter of the nacelle at the midpoint of the nacelle and the outer diameter of the nacelle at the outlet may range between about 1.20 to 1.35.

The inlet end of the nacelle may include a threaded portion enabling threading of the first mounting portion onto the nacelle.

The nacelle, the first rotor, and the second rotor may be housed entirely within the internal volume defined by the housing.

At least one of an external surface of the nacelle and an internal surface of the housing may include a coating configured to reduce skin friction.

The nacelle may include one or more cooling inlets positioned in proximity to the first rotor, and one or more cooling outlets positioned in proximity to the second rotor, the one or more cooling inlets being configured to direct a flow of air toward the generator, and optionally the voltage converter.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles thereof.

DESCRIPTION OF THE EMBODIMENTS

Reference will now be made in detail to the present exemplary embodiments of the disclosure, examples of which are illustrated in the accompanying drawings. Wherever possible, the same reference numbers will be used throughout the drawings to refer to the same or like parts.

Figure 1A:
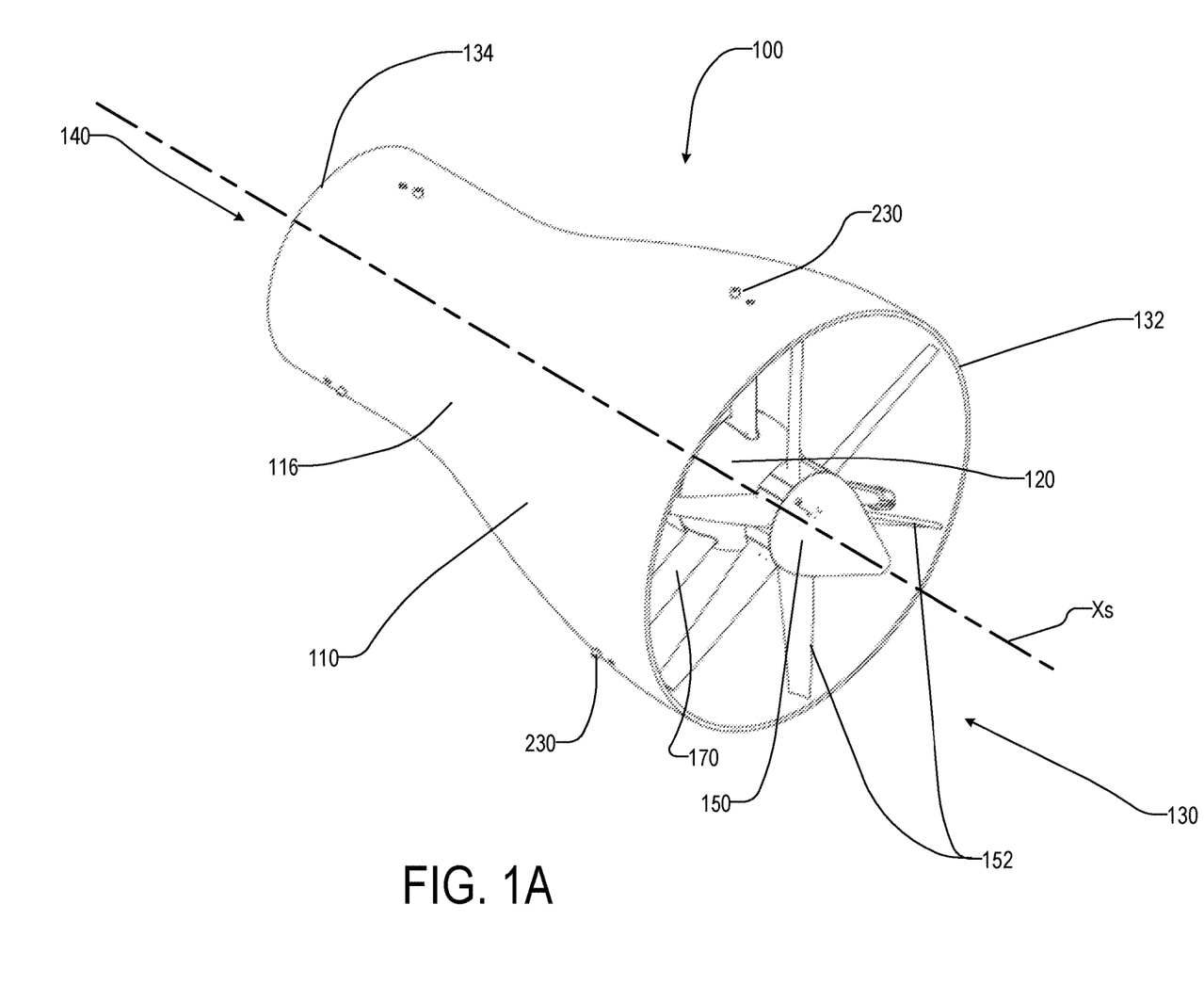
FIG. 1A is a perspective view from a front-left side of an illustrative wind-powered generator according to embodiments of the present disclosure.
Figure 1B:
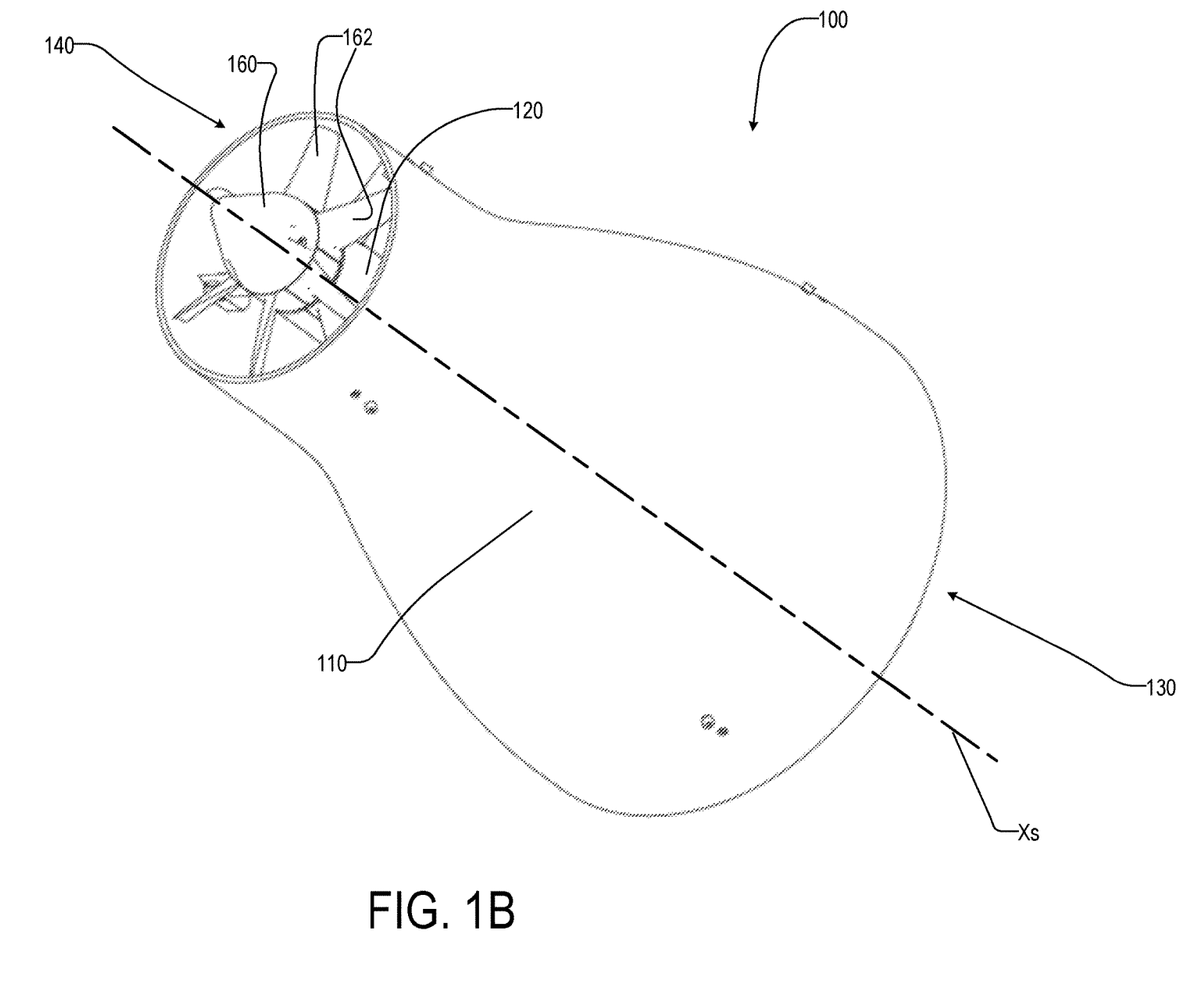
FIG. 1B is another perspective view from a rear-left of the illustrative wind-powered generator of FIG. 1A.
Figure 1C:
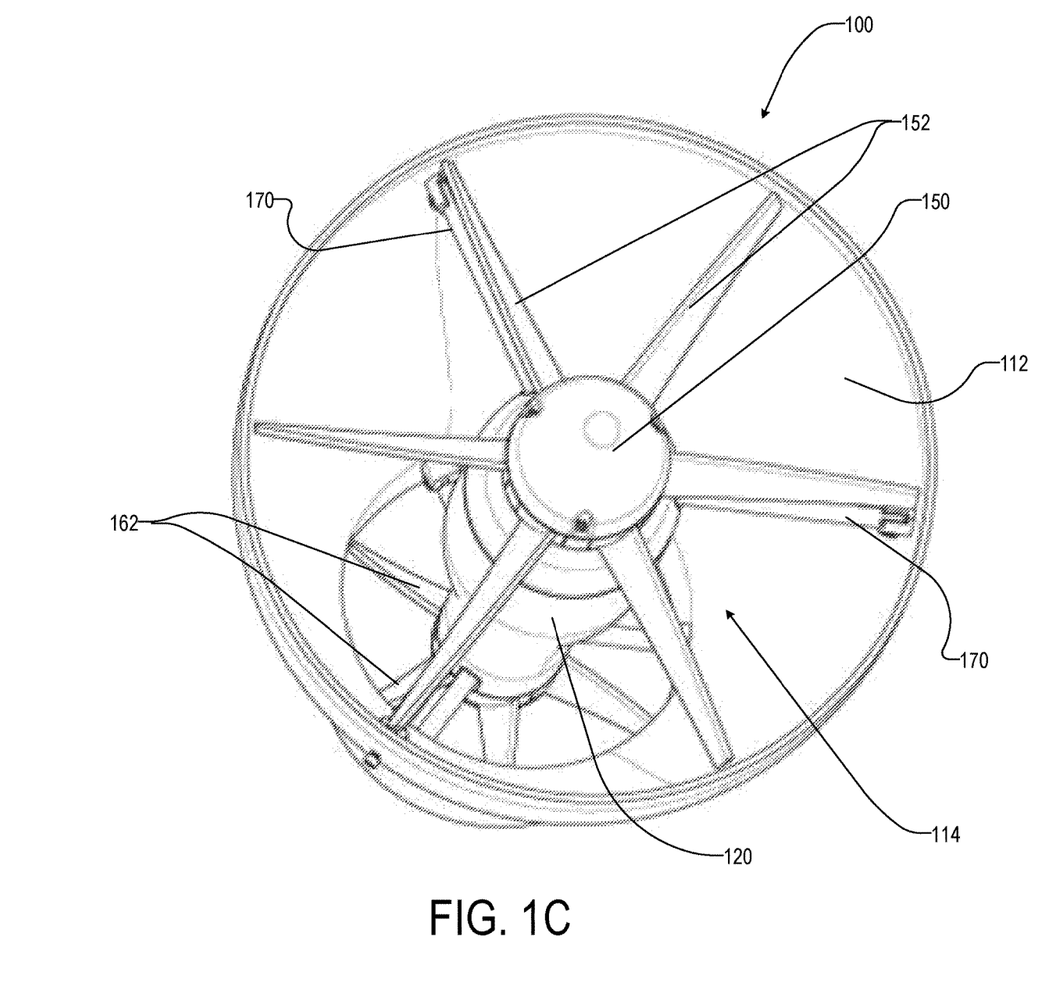
FIG. 1C is yet another perspective view from the front-bottom of the illustrative wind-powered generator of FIG. 1A.

FIGS. 1A-1C are perspective views of an illustrative wind-powered generator 100 according to embodiments of the present disclosure. Wind-powered generator 100 may include, for example, a housing 110, a nacelle 120, an inlet rotor 150, an outlet rotor 160, and supporting members 170, among others.

The housing 110 includes an inlet 130 configured to permit entry of wind into housing 110, and an outlet 140 configured to permit exit of the wind from housing 110. Wind entering inlet 130 impinges upon portions (e.g., rotor blades 152) of the inlet rotor 150 mounted on nacelle 120 to drive the inlet rotor 150 in rotation based on a blade pitch of the rotor blades 152 of inlet rotor 150. Similarly, wind exiting outlet 140 impinges upon portions (e.g., rotor blades 162) of outlet rotor 160 mounted on the nacelle 120 to drive the outlet rotor 160 in rotation based on a blade pitch of the rotor blades 162 of outlet rotor 160.

A shape and size of housing 110 and of nacelle 120 are configured to aid airflow 112 through housing 110 with the goal of restoring laminar flow to airflow having induced turbulence as a result of passing and driving inlet rotor 150, as well as supports 170. By restoring laminar flow an amount of energy extracted from the wind passing through the wind-powered generator 100 can be improved. Therefore, various features of housing 110, nacelle 120, and other components may be implemented with the intent to restore laminar flow within an internal volume 114 of housing 110 and to improve energy extraction as a whole for the wind-powered generator 100.

Each of inlet rotor 150 and outlet rotor 160 comprise a rotatable shaft and a plurality of rotor blades 152, 162 configured to extract energy from wind entering inlet 130, travelling through internal volume 114 of housing 110, and exiting outlet 140. Rotor blades 152 comprised by inlet rotor 150 may be sized such that minimal (e.g., 2-5 mm) clearance are provided between a tip of each rotor blade 152 of inlet rotor 150 and an internal surface of housing 110, and such that a desirable level of energy extraction may be achieved. For example, a sloop-type rotor blade may be implemented for rotor blades 152, the blades having a pitch between about 48.8 and 58.4 degrees Similarly, rotor blades 162 comprised by outlet rotor 160 may be sized such that minimal (e.g., 2-5 mm) clearance are provided between a tip of each rotor blade 162 of outlet rotor 160 and an internal surface of housing 110 at outlet 140, and to further achieve a desirable level of energy extraction. For example, and similar to rotor blades 152, a sloop-type rotor blade may be implemented for rotor blades 162, the blades having a pitch between about 48.8 and 58.4 degrees.

A number and size of rotor blades 152 on inlet rotor 150 may be selected based on anticipated operating conditions and a desired efficiency, among others. Similar consideration may also be given when selecting rotor blades 162 on outlet rotor 160. Notably, a number and size of rotor blades 152 may differ from that of rotor blades 162. The number of rotor blades 152 and rotor blades 162 may also be identical, depending on particular implementations. For example, inlet rotor blades may number between 6 and 12, with an outlet blade count also ranging between 6 and 12. In such configurations, the inlet rotor 150 may comprise 12 blades while the outlet rotor 160 may comprise 6 blades.

According to another example, the inlet rotor 150 may comprise 10 blades 152 and the outlet rotor 160 may also comprise 10 blades 162.

Inlet rotor 150 and outlet rotor 160 may each be linked via a respective output shaft (not shown) to one or more electrical generators 350, 360 (shown at FIG. 3C) configured to convert rotational energy into electrical power. Each output shaft may be directly linked to a generator, or may be indirectly linked via one or more gearsets to achieve a desired rotational velocity at an input to the one or more electrical generators 350, 360.

According to some embodiments, the one or more gearsets may include one or more planetary gearsets (not shown) comprising a sun gear, one or more planet gears (e.g., 3 planet gears) supported by a carrier, and a ring gear. The one or more gearsets may be configured to be selectively engaged by, for example, control circuitry to modify a gear ratio between an output shaft and a respective generator 350, 360. For example, depending on configuration of the outlet rotor 160 and inlet rotor 150, it may be desirable to reduce start up torque for the rotors 150, 160 in certain wind conditions. A first planetary gearset positioned between the output shaft and the one or more generators 350, 360 geared to allow such a reduction of torque may be engaged until spin up of the rotors is achieved.

Additionally, based on the presence of one or more planetary gear sets, it may be desirable to increase gear ratios between the inlet rotor 150 and the outlet rotor 160 and respective generators 350, 360. For example, where three planetary gearsets are provided, two of the gearsets may be engaged, while the third gearset (e.g., a torque increasing gearset) may be disengaged until engaged (e.g., via a controller).

According to some embodiments inlet rotor 150 may be connected to a planetary gearset via its respective output shaft, while outlet rotor 160 may not be connected to any planetary gearset. According to other embodiments, outlet rotor 160 may be connected to a planetary gearset, while inlet rotor 150 may not be connected to any planetary gearset. Both rotors 150 and 160 may also be provided its own gearset, or one or more common gearsets may be implemented.

Gear ratios provided by any provided planetary gearsets may range between about 4:1 and 9:1. For example, a gear ratio of 6:1 may be implemented for a first planetary gearset. Other gear ratios have been contemplated for the present invention, and those provided are exemplary only.

According to some embodiments, each of inlet rotor 150 and outlet rotor 160 may be linked to a distinct, respective electrical generator 350, 360. In other words, a first electrical generator 350 linked to inlet rotor 150 is provided, and second distinct electrical generator 360 linked to outlet rotor 160 is provided. Electrical power output of the first electrical generator 350 and the second electrical generator 360 may then be combined, for example, by providing each respective electrical power output to a voltage regulator 370 (e.g., an adjustable voltage regulator), and output as power from wind-powered generator 100.

Alternatively, inlet rotor 150 and outlet rotor 160 may be linked to a single generator, the output of which is supplied to a voltage regulator or other suitable device, and output from wind-powered generator 100.

According to some embodiments, each of inlet rotor 150 and outlet rotor 160 may comprise a rotor/shaft/generator combination available in the marketplace. For example, Windstream® Permanent Magnet DC Generator-with output currents of 1.5 A continuous, 2.5 A max (#443540). This example is not intended to be limiting, and any suitable rotor/shaft/generator combination may be implemented as desired without departing from the scope of the present disclosure.

Voltage converter 370 may be any suitable voltage converter configured to receive electrical power at a first voltage and convert (e.g., step up or step down) the voltage to a desirable second voltage. Voltage converter 370 may be an adjustable voltage converter enabling selection of an output voltage to be provided by voltage converter 370 based on input of electrical power. Various voltage converters exist in the market, and selection thereof may be made based on considerations such as, for example, size, shape, and power handling capabilities. According to some examples, a voltage converter may not be used, for example, where a desired output voltage is provided by the implemented generators.

Figure 2A:
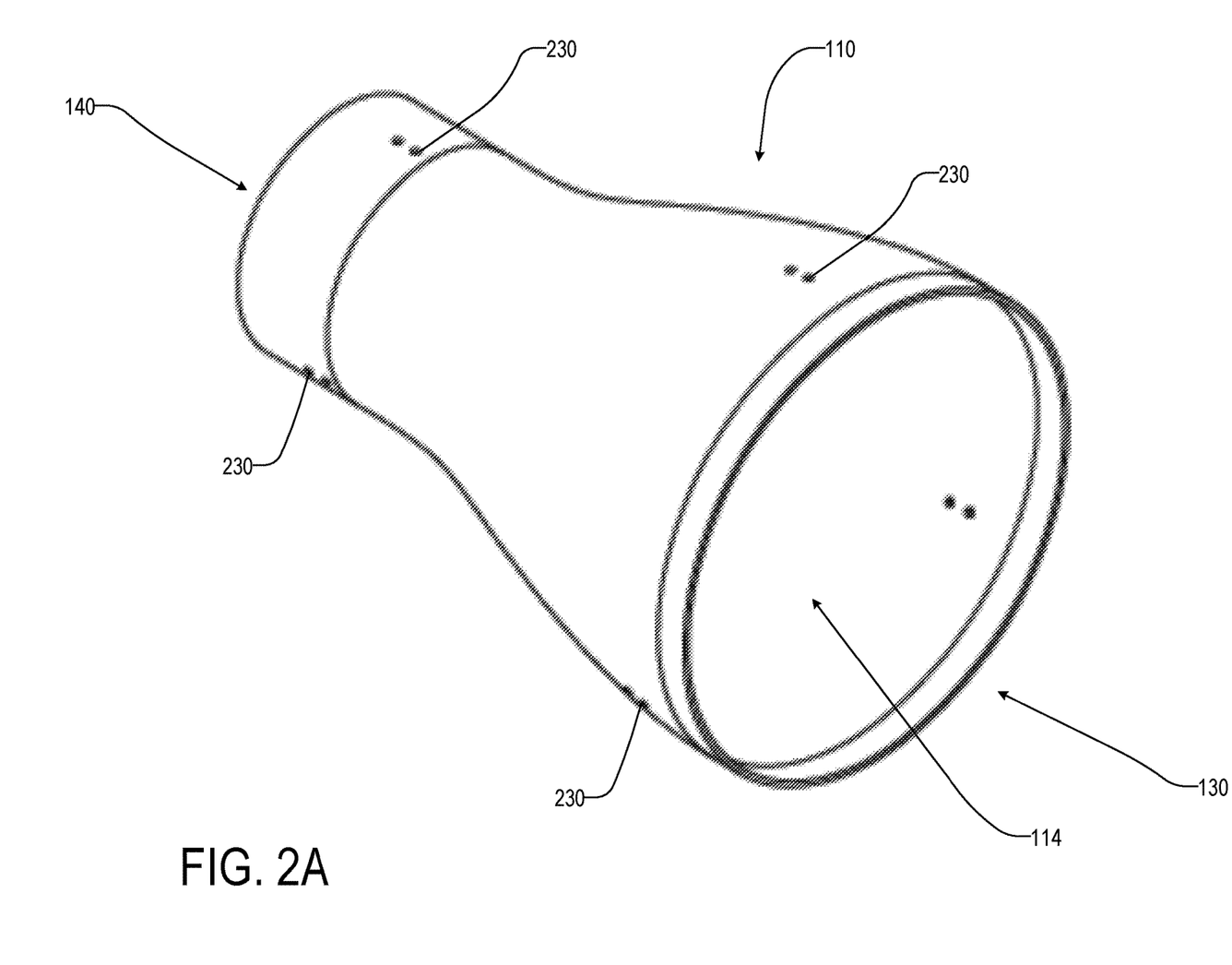
FIG. 2A is a perspective view from a front-left side of an illustrative housing for a wind-powered generator according to embodiments of the present disclosure.
Figure 2B:
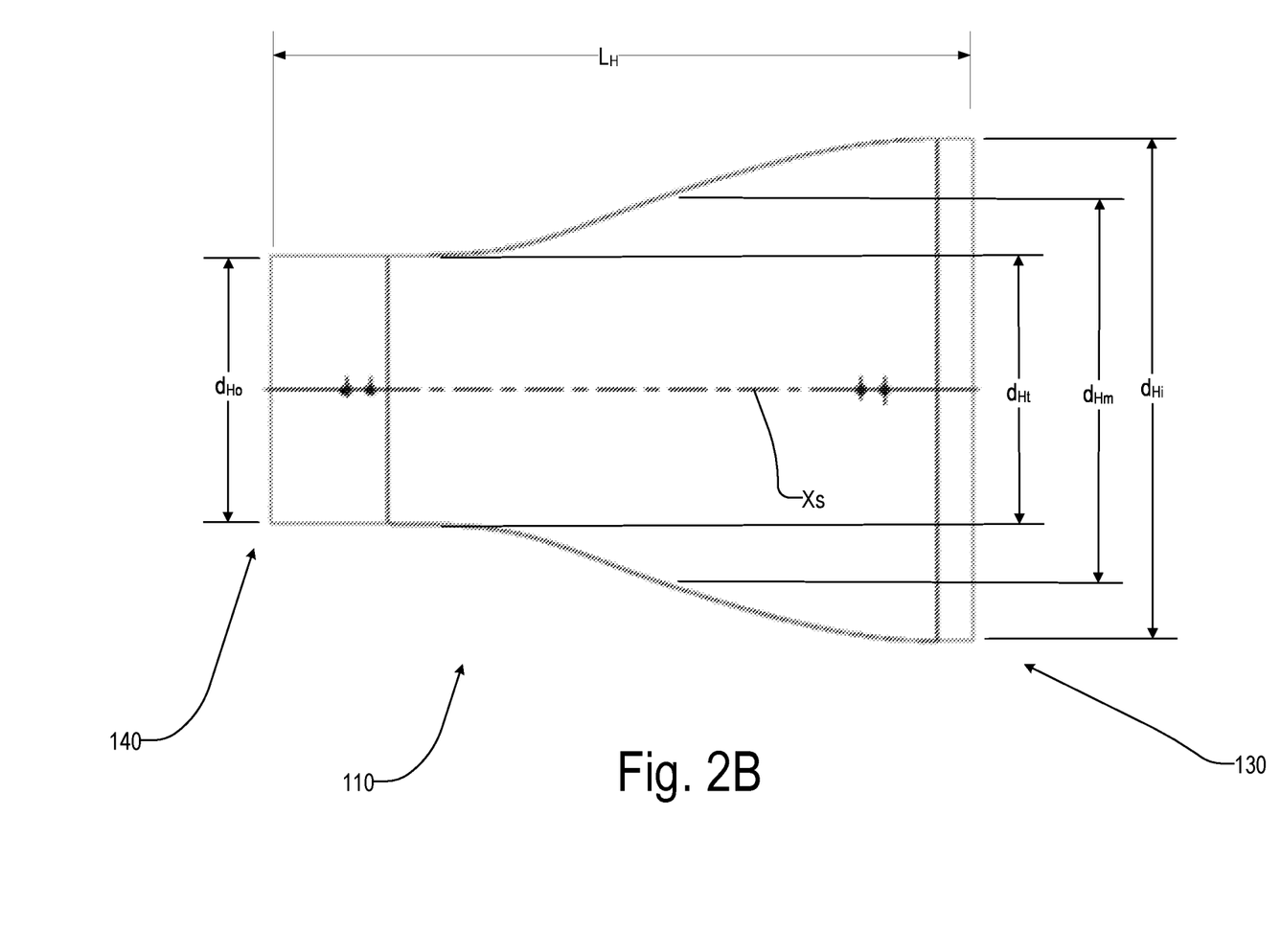
FIG. 2B is a plan view of the housing of FIG. 2A.

FIG. 2A is a perspective view from a front-left side of an illustrative housing 110 for a wind-powered generator 100 according to embodiments of the present disclosure, while FIG. 2B is a plan view of the housing of FIG. 2A. Housing 110 defines the internal volume 114 with the inlet 130 defining a first end of the housing 110 and the outlet 140 defining a second end opposite the first end. The inlet 130, outlet 140, and a throat 116 are coaxial about an axis of symmetry $X_s$ (shown at FIG. 2B) of the housing 110. The throat 116 shall be understood to be formed by housing 110 at the point along the axis of symmetry $X_s$ where the internal volume 114 reaches a minimum value.

According to some embodiments, the internal volume 114 defined by housing 110 may remain substantially constant along the axis of symmetry $X_s$ from the throat 116 to the outlet 140. In other words, the internal volume 114 between the throat 116 and a trailing edge 134 of the outlet 140 may be defined by revolution of a substantially straight line about the axis of symmetry $X_s$, and effectively, the inner diameter $d_{Ho}$ of the housing 110 at the outlet 140 is substantially equal to the inner diameter $d_{Ht}$ of the housing 110 at the throat 116.

A portion of the internal volume 114 between a leading edge 132 of the housing 110 and the throat 116 is defined by revolution of a curve about the axis of symmetry $X_s$.

The resulting curve forming the portion of the internal volume 114 between the inlet 130 and the throat 116 is configured such that a inlet-throat housing ratio $R_{iT}$ between the inner diameter $d_{Hi}$ of the housing 110 at the inlet 130 at an inner diameter $d_{Ht}$ of the housing 110 at the throat 116 ranges between about 1.85-1.97. According to some examples, the inlet-throat housing ratio $R_{iT}$ may be approximately 1.89.

The resulting curve forming the portion of the internal volume 114 is further configured such that a midpoint-inlet housing ratio $R_{Hmi}$ between an inner diameter $d_{Hm}$ of the housing 110 at a midpoint of the housing 110 along the axis of symmetry $X_s$ and the inner diameter of housing 110 $d_{Hi}$ at the inlet 130 ranges between about 0.60 to 0.80. For example, the midpoint-inlet housing ratio $R_{Hmi}$ may equal approximately 0.71.

Further, the resulting curve forming the portion of the internal volume 114 is configured such that a midpoint-outlet housing ratio $R_{Hmo}$ between the inner diameter $d_{Hm}$ of the housing 110 at the midpoint of the housing and the inner diameter $d_{Ho}$ of the housing 110 at the outlet ranges between about 1.30 to 1.40. For example, the midpoint-outlet housing ratio $R_{Hmo}$ may equal approximately 1.35.

A shape and size of housing 110 is also configured to promote portability of the wind-powered generator 100. Housing 110 ranges from about 45 cm in length to about 80 cm in length, and a length-inlet ratio $R_{Li}$ of total length $L_H$ of the housing 110 to the inlet diameter $d_{Hi}$ may range between about 1.25 and 1.60.

Notably, according to some embodiments a bounding box taken about a length and width of the wind-powered generator 100 may range from about 55 cm to about 73 cm in length, and about 40 cm to 56 cm in height and width. For example, the total length $L_H$ of the housing 110 may be approximately 60 cm, the width and height of the inlet 130 may be approximately 42 cm, and the ratio of total length of the housing 110 $L_H$ to inlet diameter $d_{Hi}$ may be approximately 1.43.

Housing 110 may be fabricated from any suitable material for use in a wind-powered generator configuration. For example, housing 100 may be formed of a plastic (e.g., polyvinyl chloride, polyethylene, etc.), metal (e.g., aluminum, titanium, stainless steel, etc.), a composite (e.g., carbon fiber, fiberglass, etc.), or any combination thereof. According to some embodiments, housing 110 may be fabricated from, for example, acrylonitrile styrene acrylate (ASA), acrylonitrile butadiene styrene (ABS), a high-density polyethylene material or any suitable combination thereof. According to some embodiments, portability may be desirable, and lightweight materials (e.g., carbon fiber, aluminum, etc.) may therefore, be preferable.

Housing 110 may be fabricated in any desirable manner. For example, housing 110 may be fabricated via roto-molding, injection molding, compression molding, extrusion, machining, three-dimensional printing, stamping, welding, etc., or any combination of suitable process. Notably, the fabrication method may depend upon the material implemented. For example, a plastic housing 110 may be fabricated via roto-molding, a metal housing 110 may be fabricated by a stamping and welding process, and a composite housing 110 may be fabricated via a compression molding process. These preceding are intended as examples of fabrication methods only, and not intended to be limiting.

A thickness of material comprising the housing 110 may be configured to enable sufficient rigidity of housing 110, while also minimizing weight. In other words, the thickness of the material comprising the housing 110 may vary based on the material used in implementation of housing 110. When a metal material is implemented, a thickness may range between 1 and 3 mm (e.g., 2.0 mm). Where a plastic material is implemented a thickness may range between 2 and 6 mm (e.g., 4.5 mm), and where a composite material is implemented, a thickness may range between 1 and 5 mm (e.g., 3 mm).

According to some embodiments, an internal surface of housing 110 may be configured to reduce skin friction. For example, machining or other techniques can be applied to the internal surface of housing 110 to reduce roughness of the surface, for example, to ISO levels N3 or below (e.g., ISO level N4), thereby reducing skin friction within the internal volume. Alternatively, or in addition, a coating with reduced frictional properties may be applied to the internal surface of housing 110 throughout the internal volume 114. Such coatings may include, for example, a polymer (e.g., polyethylene oxide, hydroxypropyl cellulose, etc.) and/or a surfactant (e.g., anionic N-hexadecanoylglutamic acid (HGA) and cationic benzyldimethyl hexadecylammonium chloride (HDBAC)) and combinations thereof.

Housing 110 may comprise one or more mounting points 230, each mounting point 230 being configured to enable a support member 170 to be removably attached thereto. For example, mounting points may comprise one or more through holes enabling passage of fasteners (e.g., screws, bolts, rivets, etc.) through housing 110 and to be affixed to a support member 170.

Housing 110 may include one or more reinforcing portions at desired points on housing 110 (e.g., at mounting points 230), the reinforcement being configured to, for example, aid structural integrity of housing 110 when assembled and mounted for operation. For example, a circumferential reinforcement (e.g., one or more metal rings) configured to enable clamping of the housing 110 within a mounting fixture (not shown), may be provided. Reinforcement may be provided within an internal structure of housing 110 (e.g., metal reinforcement overmolded with a plastic material to form housing 110).

Alternatively, or in addition, reinforcement of housing 110 may be added as an external feature, such as, for example, by affixing a reinforcement to the structure of housing 110 post-production using, for example, adhesives and/or other fasteners. Any such reinforcement of housing 110 is intended to fall within the scope of the present disclosure.

Figure 3A:
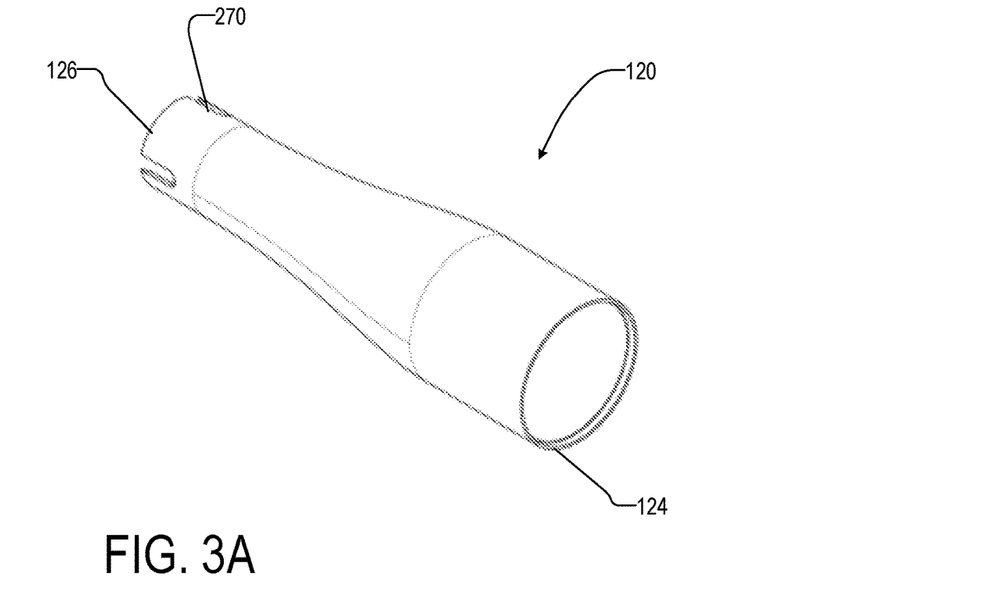
FIG. 3A is a perspective view of an illustrative nacelle for a wind-powered generator according to embodiments of the present disclosure.
Figure 3B:
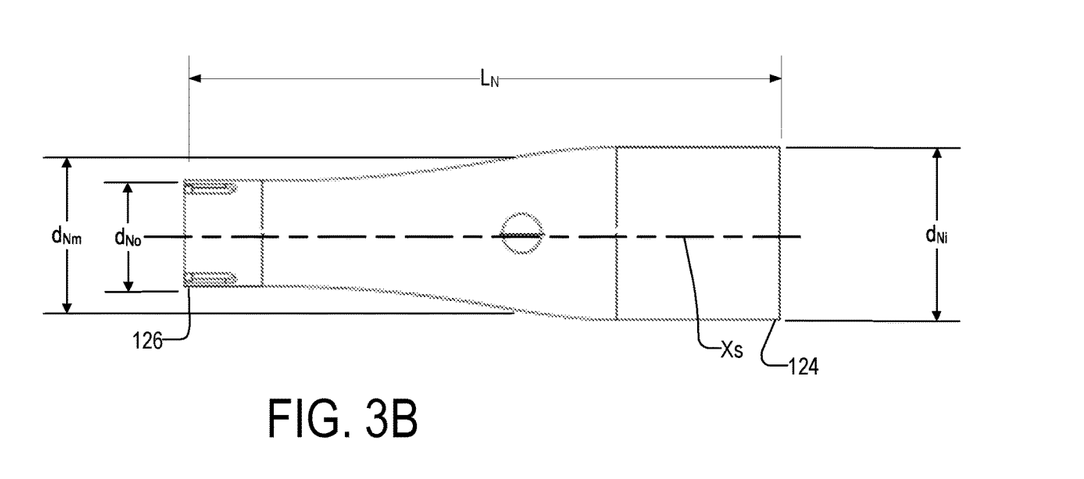
FIG. 3B is a plan view of the illustrative nacelle of FIG. 3A.
Figure 3C:
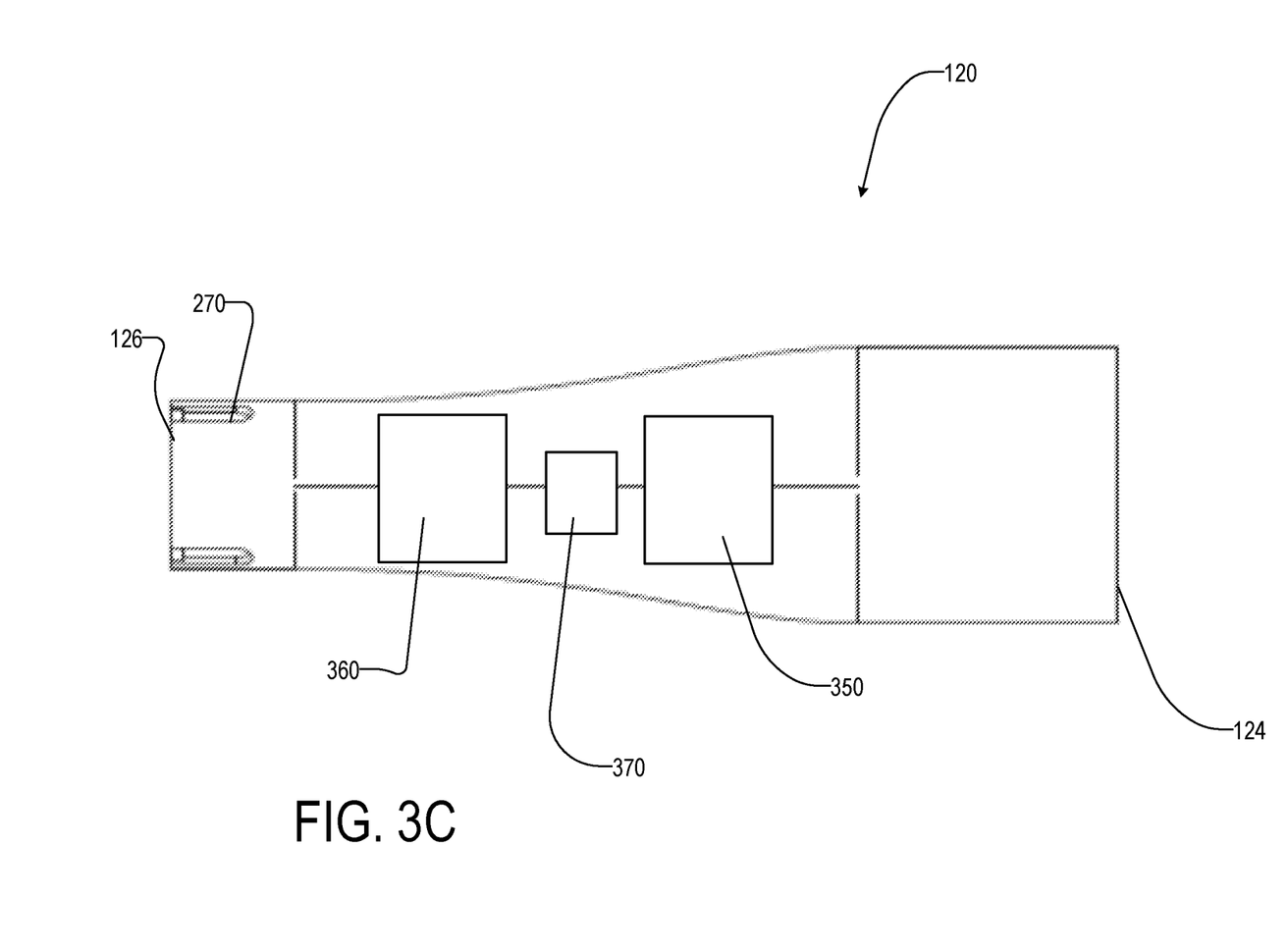
FIG. 3C is a schematic diagram of the nacelle of FIG. 3A showing installation of various components in a hollow portion of the nacelle.

FIG. 3A is a perspective view of an illustrative nacelle 120 for a wind-powered generator 100 according to embodiments of the present disclosure, while FIG. 3B is a plan view of the illustrative nacelle of FIG. 3A. Notably, FIG. 3C is a schematic diagram of the nacelle of FIG. 3A showing installation of various components in a hollow portion of the nacelle.

Nacelle 120 delimits and defines further the internal volume 114 based on assembly of the nacelle within housing 110, e.g., via one or more support members 170 at mounting points 230. Nacelle 120 is configured to support the inlet rotor 150 at a first end of nacelle 120 associated with inlet end 124, and outlet rotor 160 at a second end of nacelle 120 associated with outlet end 126. When the nacelle 120 is assembled within housing 110 with inlet and outlet rotors 150, 160 mounted thereon, blades of inlet rotor 150 are positioned substantially within inlet 130 and blades of outlet rotor 160 are positioned substantially within outlet 140. In other words, each rotor is positioned within housing 110 without any portion extending beyond a bounding box taken about housing 110.

An overall length $L_N$ of nacelle 120 from inlet end 124 to outlet end 126 may be configured based on, for example, a size and shape associated with each of inlet rotor 150 and outlet rotor 160. For example, the overall length $L_N$ of nacelle 120 may range between about 40 cm to about 50 cm. According to some embodiments the overall length of nacelle 120 may be approximately 46 cm.

Ratios describing a shape of nacelle 120 will be described taking an assembled position of nacelle 120 within housing 110 as a reference, such shape being determined by rotation about the axis of symmetry $X_s$. In other words, the axis of symmetry for nacelle 120 is coincident with the axis of symmetry $X_s$ of housing 110 when the nacelle 120 is installed within the internal volume 114 of housing 110.

According to embodiments of the present disclosure, a nacelle ratio $R_N$ between an outer diameter of the nacelle $d_{Ni}$ at the inlet end 124 to an outer diameter $d_{No}$ of the nacelle at the outlet end 126 ranges from between about 1.60-1.70. For example, the nacelle ratio may be approximately 1.64.

Further, a midpoint-inlet-nacelle ratio $R_{Nmi}$ between the outer diameter $d_{Nm}$ of the nacelle at a midpoint of the nacelle along the axis of symmetry and the outer diameter $d_{No}$ of the nacelle 120 at the leading edge 124 ranges between about 0.70 to 0.85, and a midpoint-outlet-nacelle ratio $R_{Nmo}$ between the outer diameter $d_{Nm}$ of the nacelle at the midpoint of the nacelle 120 and the outer diameter $d_{No}$ of the nacelle at the outlet ranges between about 1.20 to 1.35. For example, the midpoint-inlet-nacelle ratio $R_{Nmi}$ may equal approximately 0.77, and the midpoint-outlet-nacelle ratio $R_{Nmo}$ may equal approximately 1.26.

Inlet rotor 150 may be affixed to the nacelle 120 at an inlet end 124 of nacelle 120 in any suitable manner. According to some embodiments, inlet end 124 of nacelle 120 may be internally and/or externally threaded. A suitable inlet rotor casing may have complementary threading, thereby enabling the inlet rotor casing to be threaded into or onto inlet end 124 of nacelle 120.

According to some embodiments, inlet rotor 150 may be configured to be inserted into nacelle 120 such that an interference fit occurs upon such insertion. Retaining force associated with the interference may be configured to sufficiently retain inlet rotor 150 within nacelle 120 during operation of wind-powered generator 100.

Any suitable method for affixing inlet rotor 150 to inlet end 124 of nacelle 120 is intended to fall within the scope of the present disclosure.

Outlet rotor 160 may be affixed to nacelle 120 using similar techniques to those for affixing outlet rotor 150 to nacelle 120. For example, a casing of outlet rotor 160 may be inserted within nacelle 120 to result in an interference fit with sufficient force to retain outlet rotor 160. Alternatively, or in addition, outlet rotor 160 may be maintained in position by mounting member 170 using fasteners, for example.

Nacelle 120 may include a substantially hollow inner portion configured to house one or more components of wind-powered generator 100. For example, nacelle 120 may house one or more electrical generators 350, 360, one or more voltage regulators 370 (when implemented), output shafts associated with inlet and outlet rotors 150 and 160, etc. within its hollow inner portion. The one or more electrical generators 350, 360, and/or the voltage regulator 370 (when implemented) may be mounted within nacelle 120, e.g., on vibration absorbing mounts, and positioned to facilitate receiving input from the output shafts associated with inlet rotor 150 and outlet rotor 160.

The nacelle 120 may be fabricated from any suitable material for use in a wind-powered generator configuration. For example, nacelle 120 may be formed of a plastic (e.g., polyvinyl chloride, polyethylene, etc.), metal (e.g., aluminum, titanium, stainless steel, etc.), a composite (e.g., carbon fiber, fiberglass, etc.), or any combination thereof. According to some embodiments, nacelle 120 may be fabricated from, for example, acrylonitrile styrene acrylate (ASA), acrylonitrile butadiene styrene (ABS), a high-density polyethylene material and combinations thereof. As noted above with regard to housing 110 and according to some embodiments, portability may be desirable, and lightweight materials (e.g., carbon fiber, aluminum, etc.) may therefore, be preferable.

Notably, nacelle 120 may be formed of the same material as housing 110, or the material may differ from that of housing 110.

Nacelle 120 may be fabricated in any desirable manner. For example, nacelle 120 may be fabricated via roto-molding, injection molding, compression molding, extrusion, machining, three-dimensional printing, stamping, welding, etc., or any combination of suitable process. Notably, the fabrication method may depend upon the material implemented. For example, a plastic nacelle 120 may be fabricated via roto-molding. A metal nacelle 120 may be fabricated by a stamping and welding process, and a composite nacelle 120 may be fabricated via a compression molding process. These are intended as examples only.

A thickness of material comprising the nacelle 120 may be configured to enable sufficient rigidity of the nacelle 120, while also minimizing weight. In other words, the thickness of the material comprising nacelle 120 may vary based on the material used in implementation of housing 110. When a metal material is implemented, a thickness may range between 1 and 4 mm (e.g., 1.5 mm). Where a plastic material is implemented a thickness may range between 2 and 5 mm (e.g., 2.5 mm), and where a composite material is implemented, a thickness may range between 1 and 5 mm (e.g., 3 mm).

According to some embodiments, an external surface of nacelle 120 may be configured to reduce skin friction. For example, machining or other techniques can be applied to the external surface of nacelle 120 to reduce roughness of the surface, for example, to ISO levels N3 or below (e.g., ISO level N4), thereby reducing skin friction with between air flowing over nacelle 120 through the internal volume 114. Alternatively, or in addition, a coating with reduced frictional properties may be applied to the external surface of nacelle 120 to reduce friction between air flowing over nacelle 120 through the internal volume 114. Such coatings may include, for example, a polymer (e.g., polyethylene oxide, hydroxypropyl cellulose, etc.) and/or a surfactant (e.g., anionic N-hexadecanoylglutamic acid (HGA) and cationic benzyldimethyl hexadecylammonium chloride (HDBAC)) and combinations thereof.

Similar to housing 110, nacelle 120 may comprise one or more mounting points substantially corresponding to mounting points 230 present on housing 110, each mounting point 270 being configured to enable a support member 170 to be removably attached thereto. For example, mounting points 270 may comprise one or more slots enabling interfacing with support members 170 and/or passage of fasteners (e.g., screws, bolts, rivets, etc.) through nacelle 120 and to be affixed to a support member 170.

One or more cooling inlets (not shown) and cooling outlets (not shown) may be provided on nacelle 120, and configured to direct a portion of airflow from wind entering inlet 130 into the hollow portion of nacelle 120 to, for example, cool components housed therein. For example, one or more cooling inlets may be present on an inlet end of nacelle 120 and may be configured to direct airflow across electric generators 350, 360 and/or adjustable voltage regulator 370. Therefore, a size and shape of cooling inlets and cooling outlets may be configured such that adequate airflow is provided to cool the components housed within the hollow portion of nacelle 120 at any given operating point. When considering adequate airflow, it shall be understood to mean airflow providing a cooling effect preventing an operating temperature of one or more components (e.g., generators 350, 360, voltage converter 370, etc.) from exceeding a maximum operating temperature associated with a respective component.

Figure 4:
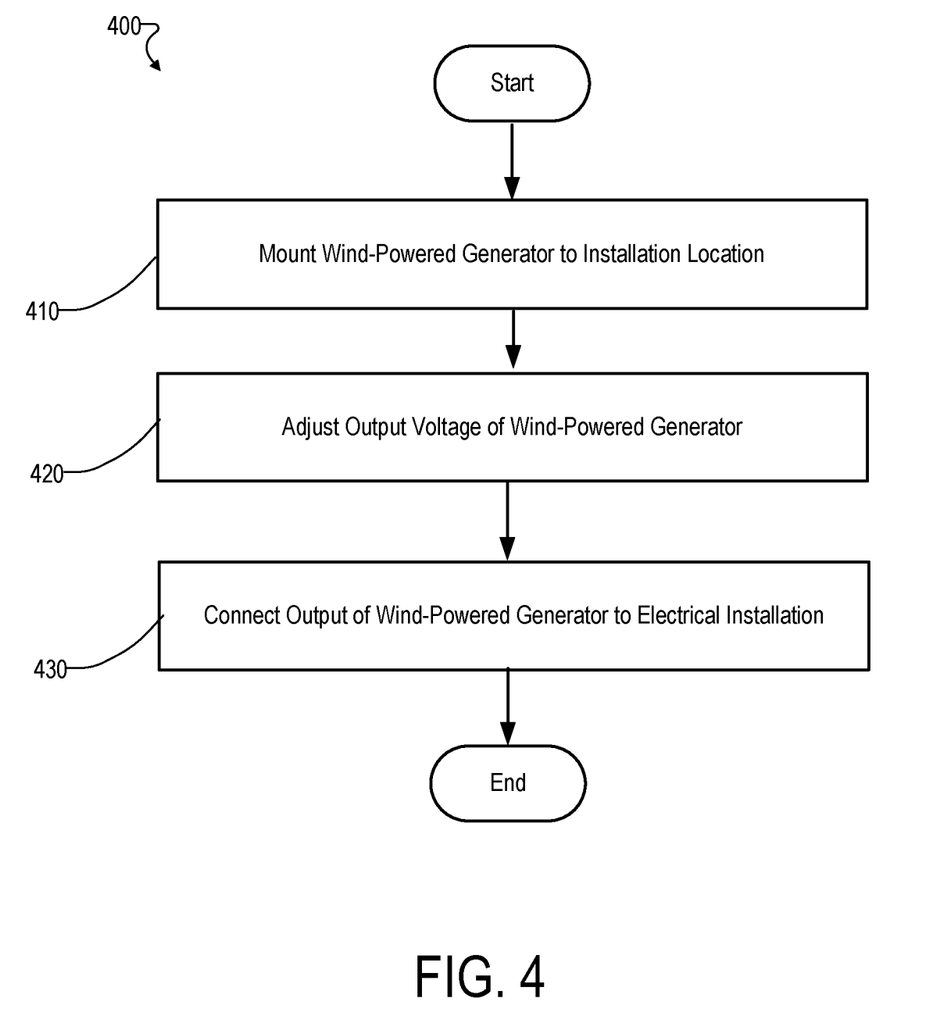
FIG. 4 is a flowchart highlighting steps of an illustrative method according to embodiments of the present disclosure.

FIG. 4 is a flowchart highlighting steps of an illustrative method 400 according to embodiments of the present disclosure. Wind-powered generator 100 may be mounted to an installation location (e.g., building, roof, tower, etc.) via any suitable mounting fixture (step 410). For example, wind-powered generator may be provided with a mounting bracket attached to reinforced portion of housing 110, as described earlier. This mounting bracket may be particularly configured for a mounting location (e.g., a home roof).

The output voltage of wind-powered generator may then be adjusted to match a voltage of an electrical installation (e.g., the power grid) associated with the installation location (step 420). For example, for a home installation in the United States, voltage converter 370 may be configured to output at 120 VAC nominal voltage. According to some embodiments, voltage converter may be adjusted to a DC voltage, for example, 18 VDC, depending on the installation (e.g., a mobile home).

Output of wind-powered generator (i.e., from voltage converter 370) may then be connected to the electrical installation associated with the mounting location (step 430). For example, wind-powered generator 370 may be configured as "plug-and-play" such that an output cable having a suitable plug may be "plugged in" to an outlet of the electrical installation. Other suitable methods for connecting output to the electrical installation may also be implemented, such as for example, via an inverter/battery configuration, connection to a breaker box of the installation, etc.

While the disclosure been made with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" and/or "about" should be understood to mean falling within such accepted tolerances.

All ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

The foregoing description of the disclosure, along with its associated examples, has been presented for purposes of illustration only. It is not exhaustive and does not limit the disclosure to the precise form disclosed. In other words, it is intended that the specification and examples be considered as exemplary only, with a true scope of the disclosure being indicated by the following claims.

What is claimed is:

1. A wind-powered generator, comprising:
   a housing defining an internal volume and having an inlet, an outlet, and a throat, the inlet, outlet, and throat being coaxial about an axis of symmetry of the housing, wherein a portion of the internal volume between a leading edge of the housing and the throat is defined by revolution of a curve about the axis of symmetry, and the internal volume between the throat and a trailing edge of the outlet is defined by revolution of a substantially straight line about the axis of symmetry;
   a nacelle separate from, and mounted within the internal volume, the nacelle comprising:
      a front rotor mounted on a first end of the nacelle and positioned at least partially within the inlet, the front rotor comprising a first output shaft configured to output a first power output; and
      a rear rotor mounted on a second end of the nacelle opposite the first end, the rear rotor being positioned at least partially within the outlet and having a diameter less than the front rotor, wherein the rear rotor comprises a second output shaft configured to output a second power output;
   wherein the first power output and the second power output are combined within an interior portion of the nacelle to provide a combined power output of the wind-powered generator, and
   wherein a nacelle ratio between an outer diameter of the nacelle at the inlet to an outer diameter of the nacelle at the outlet ranges from between about 1.60-1.70, and a housing ratio of an inner diameter of the housing at the inlet to an inner diameter of the housing at the outlet ranges from about 1.85-1.97.

2. The wind-powered generator of claim 1, wherein a midpoint-inlet-housing ratio between the inner diameter of the housing at a midpoint of the housing along the axis of symmetry and the inner diameter of the housing at the inlet ranges between about 0.60 to 0.80 and a midpoint-outlet-housing ratio between the inner diameter of the housing at the midpoint of the housing and the inner diameter of the housing at the outlet ranges between about 1.30 to 1.40.

3. The wind-powered generator of claim 1, wherein a midpoint-inlet-nacelle ratio between the outer diameter of the nacelle at a midpoint of the nacelle along the axis of symmetry and the outer diameter of the nacelle at the inlet ranges between about 0.70 to 0.85 and a midpoint-outlet-nacelle ratio between the outer diameter of the nacelle at the midpoint of the nacelle and the outer diameter of the nacelle at the outlet ranges between about 1.20 to 1.35.

4. The wind-powered generator of claim 1, wherein a ratio of total length of the housing to the inlet diameter ranges between 1.25 and 1.60.

5. The wind-powered generator of claim 1, wherein at least one of an external surface of the nacelle and an internal surface of the housing comprise a coating configured to reduce skin friction.

6. The wind-powered generator claim 1, wherein exterior dimensions of the wind-powered generator range from about 55 cm to about 73 cm in length, and about 40 cm to 56 cm in height and width.

7. The wind-powered generator of claim 1, further comprising:
   two or more electrical generators operably connected to the first and second output shafts to generate the combined output to produce electrical power; and
   a voltage converter configured to convert the electrical power to enable matching of an output voltage of the wind-powered generator to a voltage at an installation site.

8. A method for using the wind-powered generator of claim 1 comprising:
   mounting the wind-powered generator directly or indirectly on a building;
   adjusting an output voltage of the wind-powered generator; and
   connecting the wind-powered generator to an electrical installation of the building.

9. The wind-powered generator of claim 1, wherein a ratio of total length of the housing to the inlet diameter is 1.43.

10. A portable wind-powered generator, comprising:
    a housing defining an internal volume, the housing comprising:
       an inlet forming a first opening to the internal volume and positioned at a first end portion of the housing; and
       an outlet forming a second opening to the internal volume and positioned at a second end portion of the housing;
    a front rotor having a first rotor diameter enabling rotation within the first opening, and comprising a first mounting portion and a first output shaft;
    a rear rotor having a second rotor diameter less than the first rotor diameter enabling rotation within the second opening, the rear rotor comprising a second mounting portion and a second output shaft;
    a hollow nacelle comprising:
       an inlet end configured to enable affixing of the first mounting portion to the nacelle;
       an outlet end configured to enable affixing of the second mounting portion to the nacelle; and
       at least two electrical generators positioned within an internal portion of the nacelle, wherein the first output shaft is linked to a first of the at least two electrical generators and the second output shaft is linked to a second of the at least two electrical generators within the internal portion of the nacelle;
    and a voltage converter configured to receive electrical power from the at least two generators and convert a voltage of the electrical power to a determined voltage.

11. The portable wind-powered generator of claim 10, wherein the voltage converter is positioned within the internal portion of the nacelle.

12. The portable wind-powered generator of claim 10, wherein exterior dimensions of the wind-powered generator range from about 55 cm to about 73 cm in length, and about 40 cm to 56 cm in height and width.

13. The portable wind-powered generator of claim 10, wherein the housing is configured to be removably mounted to a building fixture.

14. The portable wind-powered generator of claim 10, wherein the housing comprises a circumferential reinforcement configured to enable clamping of the housing within a mounting fixture.

15. The portable wind-powered generator of claim 10, wherein the determined voltage matches the voltage of an electrical installation of a building on which the portable wind-powered generator is mounted.

16. The wind-powered generator of claim 15, wherein the voltage converter is adjustable.

17. The portable wind-powered generator of claim 10, wherein a midpoint-inlet-housing ratio between the inner diameter of the housing at a midpoint of the housing along an axis of symmetry and an inner diameter of the housing at the inlet ranges between about 0.60 to 0.80 and a midpoint-outlet-housing ratio between the inner diameter of the housing at the midpoint of the housing and the inner diameter of the housing at the outlet ranges between about 1.30 to 1.40, and wherein a midpoint-inlet-nacelle ratio between an outer diameter of the nacelle at a midpoint of the nacelle along the axis of symmetry and an outer diameter of the nacelle at the inlet ranges between about 0.70 to 0.85 and a midpoint-outlet-nacelle ratio between the outer diameter of the nacelle at the midpoint of the nacelle and the outer diameter of the nacelle at the outlet ranges between about 1.20 to 1.35.

18. The portable wind-powered generator of claim 10, wherein the nacelle, the front rotor, and the rear rotor are housed entirely within the internal volume defined by the housing.

19. The portable wind-powered generator of claim 10, wherein at least one of an external surface of the nacelle and an internal surface of the housing comprise a coating configured to reduce skin friction.

20. The wind-powered generator of claim 10, wherein the voltage converter is adjustable.

\* \* \* \* \*